March 29, 1966  R. E. NORTH ETAL  3,242,565
FLUXLESS JOINING OF STAINLESS STEEL TO ALUMINUM
Filed Feb. 6, 1963  2 Sheets-Sheet 1

INVENTORS
ROBERT E. NORTH
DONALD A. DOMROSE
BY
ATTORNEYS

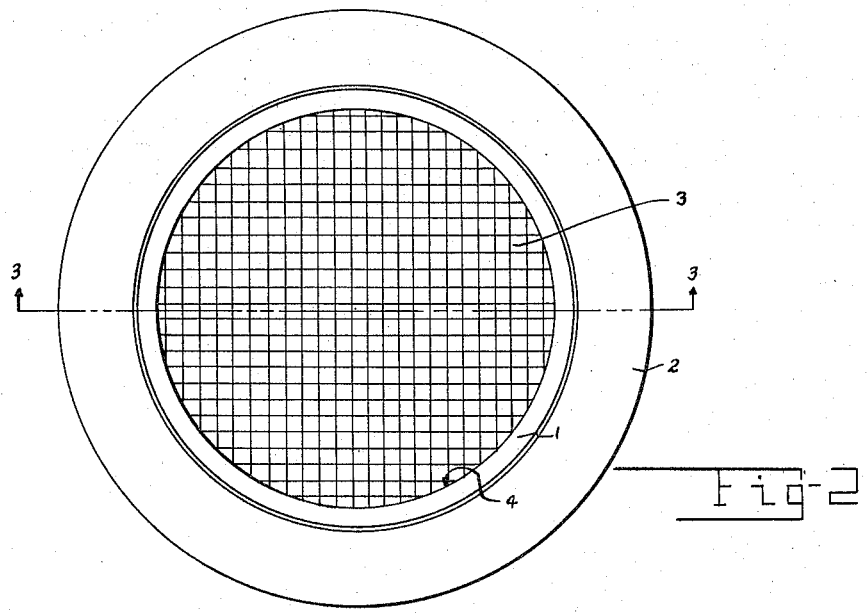
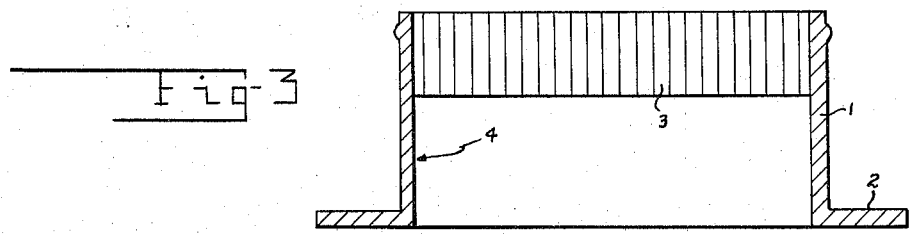
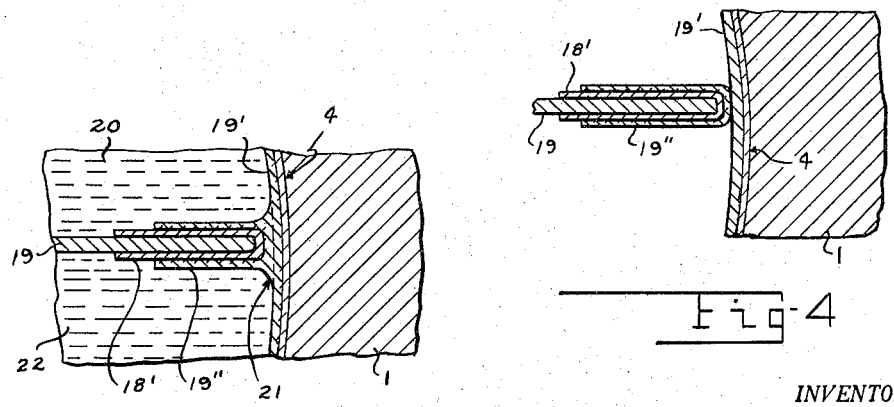
INVENTORS
ROBERT E. NORTH
DONALD A. DOMROSE
BY
ATTORNEYS

United States Patent Office 3,242,565
Patented Mar. 29, 1966

3,242,565
FLUXLESS JOINING OF STAINLESS STEEL TO ALUMINUM
Robert E. North, St. Paul, and Donald A. Domrose, Minneapolis, Minn., assignors to the United States of America as represented by the Secretary of the Air Force
Filed Feb. 6, 1963, Ser. No. 256,780
6 Claims. (Cl. 29—487)

The subject invention relates to an improved method of reliably bonding stainless steel material to aluminum, and more particularly, to a method of joining honeycomb-shaped stainless steel material to aluminum duct material so as to provide a lightweight RF shielding in aluminum aircooling ducts of missile-borne computers, an object of the invention being the method or process for joining the stainless steel honeycomb material to the surrounding aluminum duct material without employing flux.

A further object is a method for joining a stainless steel honeycomb core structure to the inner surface of an aluminum duct to provide an effective RF shield which is electrically conductive, while sufficiently stable to withstand temperatures up to 600° F.

Previous methods of joining stainles steel to aluminum involved "cladding" the stainless steel with aluminum by roll bonding, or by dipping into a molten bath of aluminum and then joining it to the aluminum by torch or dip-brazing at a temperature of 1070° to 1100° F., using flux. This method was expensive and caused a lot of distortion and incomplete RF shielding. Special techniques were necessary if a part was to be used in 500° to 600° F. environments. Plating the parts with nickel and soft-soldering with high-temperature solder, using flux, was also expensive and found to be subject to "operator error" in failing to eliminate all metallic discontinuities on internal joints.

In order to provide an effective RF shield, the honeycomb-to-duct joint or joints must be electrically conductive, and every joint has to be perfect. There should be no voids or metallic discontinuities of any kind between the honeycomb unit or structure and its surrounding aluminum duct.

A further object of the invention is the provision of a method of first fabricating the stainless steel honeycomb structure so as to precisely fit the interior of the duct in circumferential contact therewith, disassembling and chemically cleaning the parts, plating the parts with a thin coating or layer of "electrolytic" nickel, then electroplating with a thin coating of tin, then drying and assembling the parts without contamination, then dipping the parts in a tin fusing bath of hot oil at 500° to 525° F. for causing the tin coating on and between the parts to melt and fuse to form a homogeneous metallic joint between the parts, and cause the fused tin coatings to combine with the nickel coatings on the parts to form a tin-nickel alloy juncture with a raised remelt temperature thereof at the joint in excess of 600° F. so that the fused tin nickel juncture between the parts can withstand operating temperatures of 600° F. and then completely degreasing the same to remove all traces of the heating oil therefrom.

The invention will be better understood with reference to the following description, taken in connection with the accompanying drawings, in which:

FIG. 2 is a top plan view of the completed or assembled article itself;

FIG. 3 is a cross-sectional view of the article shown in FIG. 2, taken about on line 3—3 of FIG. 2;

Figure 1:
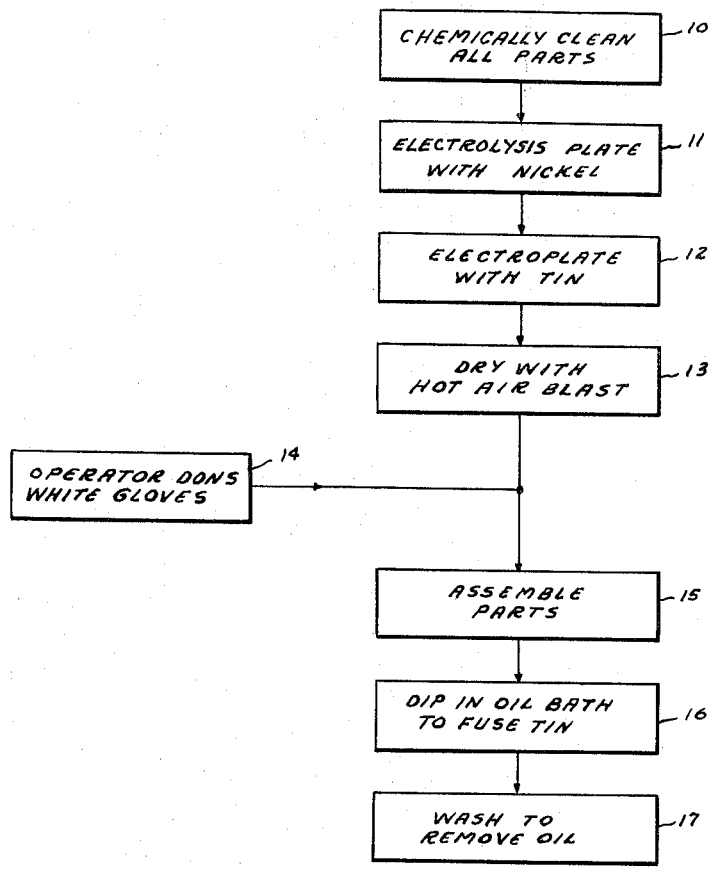
FIG. 1 is a flow chart of the method or process for joining the stainless steel honeycomb core structure or part to the surrounding aluminum duct or part.

FIG. 4 is a greatly enlarged fragmentary detail sectional view, schematically showing a portion of the aluminum duct and a panel of the honeycomb core illustrating the thin nickel plating and the thin tin electro-overplating thereon, with the tinned surfaces in contact; and FIG. 5 is a similar view, showing the application of the hot oil tin fusing bath and the contacting tin plated surfaces fused together.

Reference being made to FIGS. 2 and 3 showing a specific application, the reference numeral 1 denotes a tubular duct of aluminum, shown cylindrical or circular in cross section, having a supporting flange 2, the inner surface 3 thereof having been chemically cleaned and plated with a minimum of a .0003 inch coating of electrolytic nickel, this nickel coating being then electroplated thereover with a similar .0003 inch minimum coating or layer of tin and then thoroughly dried.

The reference numeral 4 denotes the thin stainless steel honeycomb core which has been fabricated to precisely fit the interior of the duct 1 and has also been chemically cleaned and plated (particularly around its periphery) with a minimum of .0003 inch thickness of electrolytic nickel, then electroplated thereover with .0003 inch minimum thickness of tin, and then thoroughly dried.

Still referring to FIGS. 2 and 3, the honeycomb core of stainless steel 4 and the duct 1 are handled with clean white gloves to prevent any contamination of the plated surfaces thereon and the core is then inserted into the duct, as shown, with the tinned periphery of the stainless steel honeycomb core structure in contact with the inner tinned surface 3 of the duct, so that the electroplated tin coating at the outer ends of the stainless steel honeycomb core are in contact with the annular inner electroplated tin surface of the duct 1.

The assembled duct and honeycomb core structure are then held together and dipped into a hot tin fusing bath having a temperature from 500° to 525° F. to fuse the electroplated tin coatings on the inner surface of the duct and the periphery of the stainless steel honeycomb core together to cause the tin to melt and form a proper homogeneous electrical contact joint, also to cause the fused tin to combine with the nickel coating on which it was deposited to form a tin-nickel alloy having a much higher remelt temperature than the initial tin plating, the remelt temperature of the now formed tin-nickel alloy coating being in excess of 600° F.

Thus, the joint or juncture between the periphery of the core of the honeycomb structure and the duct can satisfactorily stand operating temperature of 600° F., and tests have confirmed the fact that perfect RF shielding properties of the fused juncture are accomplished.

In the flow diagram, as shown in FIG. 1, the improved method or process employed is set forth as follows:

The stainless steel parts and the aluminum parts in unassembled relation are first chemically cleaned by any suitable cleaning solution or means, and thoroughly dried, as indicated at 10. Next, the unassembled parts or surfaces which are to be bonded together are plated with a thin coating of electrolytic nickel to a minimum thickness of .0003 inch, as indicated at 11.

The parts are then electroplated with a thin layer or plating of tin having a minimum thickness of .0003 inch, and a melting and boiling point respectively of about 359° F. and 460° F., as indicated at 12.

Next, the parts are thoroughly dried with a hot air blast, until completely dry and, of course, clean, as indicated at 13.

Next, the parts are assembled (as seen in FIGS. 2 and 3) without contamination, being handled and assembled by an operator wearing clean white gloves to avoid contamination, as indicated at 14 and 15 in the flow diagram in FIG. 1. This leaves the tin coated edges of the parts which are to be secured together in contact with each other as seen more particularly in FIG. 4.

The assembled stainless steel and aluminum parts are next dipped in a suitable hot oil bath having a temperature of from 500° to 525° F. to fuse the contacting tin coatings together to provide a homogeneous electrically conductive connection and bond between the outer aluminum duct 1 and the inner stainless steel honeycomb core part 3, as indicated at 16 and seen in FIG. 5. This heating step 16 such as a hot oil bath between 500° to 525° F. in surrounding relation to the juncture between the two parts not only causes the tinned parts to fuse together to form a homogeneous metallic juncture but it causes the melted or fused tin plating to combine with the nickel under layer to form a higher fusing temperature tin nickel alloy than the first tin plating, whereby the "remelt" temperature of this so-formed tin nickel alloy is raised in excess of 600° F. to provide a safe and satisfactory working temperature at the juncture of 600° F. between the parts without the likelihood of fusion at the juncture between the inner stainless steel honeycomb and outer aluminum duct parts during the operation thereof at 600° F.

The process is then completed by the step of subjecting the parts to a suitable cleaning solution or bath, such as hot trichlorethylene vapor to completely degrease the same to remove all traces of oil therefrom, as indicated at 17 in the flow diagram of the method depicted in FIG. 1.

Referring to FIGS. 4 and 5 illustrating a fragmentary junction of one of the honeycomb elements and a portion of the duct on a greatly enlarged scale, the reference numerals 18 and 18' denote respectively the first or nickel layer deposited on the inner surface 4 of the duct 1, and on the end of one of the stainless steel honeycomb members 19, while the numerals 19' and 19" schematically denote the tin electroplated layers of tin deposited respectively on the nickel coatings 18 and 18'.

FIG. 5 diagrammatically illustrates the application of the liquid heating medium, by dipping into a hot tin fusing bath, indicated at 20, such as a suitable hot oil at a temperature of 500° to 520° F., which is above the tin boiling point, in which the tin coatings on the parts are fused together, as at 21, in the confining hot oil bath 22, wherein the thin tin coatings combine with the thin nickel coatings to form an outer tin-nickel alloy, thus raising the remelt temperature of the now alloyed tin coatings 19', 19", particularly at the junctures in excess of 600° F. whereby the junctures between the parts will satisfactorily withstand operating temperatures of 600° F.

Having thus described the invention, what is claimed as new is:

1. The method of bonding interfitting parts of stainless steel to aluminum parts without flux which comprises, chemically cleaning the parts, plating the parts with a thin coating of electrolytic nickel, electroplating the nickel coating with a thin overcoating of tin, drying the parts, assembling the parts without contamination thereof to dispose the tinned surfaces thereof in contact with each other, subjecting the assembled parts to a hot bath having a temperature in excess of the melt temperature of the tin coatings thereon to fuse the contacting tinned coatings on the assembled parts together at their contacting surfaces, and form a tin-nickel alloy thereon with the nickel coatings, to provide an increased remelt temperature of the fused joints between the assembled parts.

2. The method of bonding interfitting contacting aluminum and stainless steel parts together which comprises, thoroughly cleaning the parts in unassembled relation to remove all traces of impurities and contamination from the surfaces thereof, plating the surfaces of the parts with a thin coating of electrolytic nickel having a minimum thickness of .0003 inch, electroplating the nickel coatings with a thin tin coating having a minimum thickness of .0003 inch, thoroughly drying the parts, assembling the parts in their interfitting contacting relation without contamination of the tinned contacting surfaces therebetween, heating the assembled parts in a liquid bath having a temperature between 500° and 525° F. to fuse the contacting tinned coatings between the parts to form a homogeneous metallic juncture therebetween and transform the fused tin coating on the nickel undercoating to a tin-nickel alloy having a remelt temperature in excess of 600° F., and thoroughly cleaning the assembled parts in a hot cleansing vapor to remove all traces of hot liquid heating bath therefrom.

3. The method of bonding an aluminum duct to an interfitting stainless steel honeycomb core which comprises, thoroughly cleaning the parts in unassembled relation to remove all traces of impurities and contamination from the interfitting surfaces thereof, plating the interfitting surfaces of the parts with a thin coating of electrolytic nickel having a thickness not less than .0003 inch, electroplating the thin nickel coating with a tin overcoating having a minimum thickness of .0003 inch, thoroughly drying the nonassembled parts, assembling the honeycomb core in the duct with the tinned coating thereof in contact with the tinned coating in the duct, dipping the assembled parts in a tin fusing bath of hot oil at 500° F. to 525° F. to melt the tin coatings thereon to form a metallic fused joint therebetween, whereby the fused tin coating forms a tin-nickel alloy with the nickel coating having a remelt temperature in excess of 600° F., whereby the fused joints between the duct and honeycomb core withstands an operating temperature of 600° F. and provides perfect RF shielding properties at the joint, and thoroughly degreasing the assembled duct and core in a hot degreasing vapor, such as trichlorethylene vapor, to remove all traces of the oil bath therefrom.

4. The method of bonding dissimilar metals, such as aluminum and stainless steel together to form a fused metallic bond therebetween comprising, surface coating the parts of the metals to be bonded together with a thin plating of electrolytic nickel, overcoating the thin nickel plating with a thin coating of tin, bringing the tin overcoated surfaces of the dissimilar metals together without contamination of the tinned surfaces thereon, dipping the tinned surfaces of the dissimilar metals in contacting relation with each other in a hot liquid bath having a temperature in excess of the boiling temperature of the tin coatings to fuse the tin coatings on the assembled dissimilar metals together to form a fused tin metallic juncture therebetween, and to alloy the nickel undercoating with the tin overcoating to transform the tin coating to a tin-nickel alloy having a remelt temperature considerably above the boiling temperature of tin, cooling the dissimilar metals in contacting relation to solidify the fused tin-nickel alloy bond therebetween, and thoroughly cleansing the dissimilar metals to remove all traces of the hot liquid tin fusing bath therefrom.

5. The method of bonding a nonferrous metal to an interfitting ferrous metal to form a fused metallic bond between the metals having a fusing temperature above the boiling temperature of tin, which comprises the steps of separating the metals, cleaning the metals to remove any contamination from the interfitting surfaces thereof, plating the interfitting contacting surfaces thereof with a thin coating of electrolytic nickel having a minimum thickness of .0003 inch, overplating the nickel plating with a similar thin coating of tin having a minimum thickness of .0003 inch, thoroughly cleansing and drying the unassembled plated parts by a hot air blast, assembling the interfitting metals without contamination of the plated surfaces thereof to dispose the tinned surfaces in contact with each other, dipping the assembled metals aforesaid into a bath of hot oil having a temperature from 500 to 525° F. to fuse the contacting tin coatings on the metals together to form a homogeneous metallic connection and bond between the metals, and to transform the tin overcoating thereon to a nickel-tin alloy formed from nickel coating during the heating thereof above the boiling point of the tin coating, removing the assembled parts from the hot oil bath with the tinned contacting surfaces in contact with each other, allowing the same to cool below the fusing point of the tin alloy coating, subjecting the metals to a cleaning medium comprising hot trichlorethylene vapor or the like to completely degrease the same and remove all traces of oil bath therefrom.

6. The method of metallic bonding an inner stainless steel honyecomb core to the inner surface of an outer aluminum duct structure to form a fused homogeneous metallic bond therebetween which comprises the steps of thoroughly cleaning the inner surface of the aluminum duct and the outer surface of the honeycomb core before assembly to remove all contamination therefrom, plating the inner surface of the aluminum duct and the outer surface of the stainless steel honeycomb core in unassembled relation with a thin coating of electrolytic nickel, having a thickness of not less than .0003 inch, overplating the nickel plating thereon with a similar thin coating of tin having a thickness not less than .0003 inch, thoroughly drying the duct and core removing any contamination that should be present thereon, assembling the stainless steel honeycomb core in the aluminum duct without contamination thereof to dispose the tinned surfaces thereof in contact with each other, submerging the contacting tinned surfaces of the core and duct while in assembled relation, in a bath of hot oil having a temperature from 500° F. to 525° F. to fuse the contacting tinned surfaces thereof together to form a homogeneous metallic supporting connection and bond between the duct and core members, and transfuse a portion of the electrolytic nickel coating into the tin coating to transform the outer tin plating into a tin-nickel alloy plating to raise the remelt temperature thereof higher than 600° F., removing the duct and core from the aforesaid hot oil bath in assembled relation and allowing the same to cool to solidify the fused metallic bond aforesaid therebetween, thoroughly degreasing the assembled duct and core in a hot trichloroethylene vapor to remove all traces of oil therefrom, whereby the assembled stainless steel honyecomb and duct structure may be used in a working temperature at the juncture therebetween of 600° F. without danger of fusing of the bond between the duct and core.

References Cited by the Examiner
UNITED STATES PATENTS

| | | | |
|---|---|---|---|
| 699,592 | 5/1902 | Thompson | 29—502 |
| 2,001,186 | 5/1935 | Dornier | 29—502 XR |
| 2,937,438 | 5/1960 | Lemon | 29—488 |

JOHN F. CAMPBELL, *Primary Examiner.*